United States Patent
Xu et al.

(10) Patent No.: US 11,706,107 B2
(45) Date of Patent: Jul. 18, 2023

(54) DATA MANAGEMENT METHOD AND APPARATUS

(71) Applicant: HUAWEI TECHNOLOGIES CO., LTD., Shenzhen (CN)

(72) Inventors: Ruiyue Xu, Shanghai (CN); Kai Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/121,780

(22) Filed: Dec. 15, 2020

(65) Prior Publication Data

US 2021/0099365 A1    Apr. 1, 2021

Related U.S. Application Data

(63) Continuation of application No. PCT/CN2019/091407, filed on Jun. 14, 2019.

(30) Foreign Application Priority Data

Jun. 15, 2018 (CN) .......................... 201810623921.1

(51) Int. Cl.
*H04L 41/50* (2022.01)
*G06F 16/24* (2019.01)
*H04L 41/0803* (2022.01)

(52) U.S. Cl.
CPC .......... *H04L 41/5058* (2013.01); *G06F 16/24* (2019.01); *H04L 41/0803* (2013.01)

(58) Field of Classification Search
None
See application file for complete search history.

(56) References Cited

U.S. PATENT DOCUMENTS 9,531,607 B1 * 12/2016 Pai .......................... H04L 43/16
10,404,579 B1 * 9/2019 Biemueller ............. H04L 61/25
(Continued)

FOREIGN PATENT DOCUMENTS

CN      101008955 A     8/2007
CN      101330402 A    12/2008
(Continued)

OTHER PUBLICATIONS

International Search Report PCT Application No. PCT/CN2019/091407 dated Sep. 27, 2019.
(Continued)

*Primary Examiner* — Mohamed A. Wasel
*Assistant Examiner* — Gregory P Tolchinsky

(57) ABSTRACT

This application provides a data management method and an apparatus, and relate to the field of data storage, to implement unified management of management data. The method includes: A management service function unit receives an association relationship configuration request, where the association relationship configuration request carries association information used to configure an association relationship between a first management function unit and a first management data function unit; receives a first query request, where the first query request carries instance information of the first management function unit or instance indication information of the first management function unit; determines instance information that is of the first management data function unit and that corresponds to the instance information of the first management function unit; or determines instance information that is of the first management data function unit and that corresponds to the instance indication information of the first management function unit.

19 Claims, 9 Drawing Sheets

(56) References Cited

U.S. PATENT DOCUMENTS

| | | | |
|---|---|---|---|
| 2011/0314157 A1 | 12/2011 | Saito | |
| 2012/0078931 A1* | 3/2012 | Jaquette | G06F 16/24 |
| | | | 707/758 |
| 2016/0021181 A1 | 1/2016 | Ianakiev et al. | |
| 2017/0141973 A1 | 5/2017 | Vrzic | |
| 2020/0059407 A1* | 2/2020 | Lu | H04L 41/0803 |
| 2020/0260371 A1* | 8/2020 | Wang | H04W 48/18 |
| 2020/0396132 A1* | 12/2020 | Wang | H04L 29/06 |
| 2021/0235244 A1* | 7/2021 | Bartolome Rodrigo | |
| | | | H04W 4/50 |

FOREIGN PATENT DOCUMENTS

| | | |
|---|---|---|
| CN | 102609432 A | 7/2012 |
| CN | 104468274 A | 3/2015 |
| CN | 104717258 A | 6/2015 |
| CN | 105282765 A | 1/2016 |
| CN | 105450330 A | 3/2016 |
| CN | 105592130 A | 5/2016 |
| CN | 107734571 A | 2/2018 |
| EP | 2437524 A1 | 4/2012 |
| WO | 2018090191 A1 | 5/2018 |

OTHER PUBLICATIONS

Extended European Search Report for Application No. 19819597.6 dated Jul. 5, 2021, 10 pages.

Examination Report for Indian Application No. 202037055594 dated Dec. 28, 2021, 5 pages.

Yan Zhiyu, Research on the coexistence of NR system and LTE system. Telecommunications Network Technology, Dec. 2017, 5 pages.

Shen Xia et al, Analysis on technology schemes of applications in the 5G NR, Telecommunications Network Technology, Dec. 2017, 6 pages.

Office Action for Chinese Application No. 201810623921.1 dated Nov. 9, 2021, 6 pages.

\* cited by examiner

DATA MANAGEMENT METHOD AND APPARATUS

CROSS-REFERENCE TO RELATED APPLICATIONS

This application is a continuation of International Application No. PCT/CN2019/091407, filed on Jun. 14, 2019, which claims priority to Chinese Patent Application No. 201810623921.1, filed on Jun. 15, 2018. The disclosures of the aforementioned applications are hereby incorporated by reference in their entireties.

TECHNICAL FIELD

Embodiments of this application relate to the field of data storage, and in particular, to a data management method and an apparatus.

BACKGROUND

With development of 5G communications technologies, a 5G network management system tends to be service-oriented. To be specific, different management functions (management function, MF) may be deployed for different network functions based on a requirement. Each MF manages one network element in a 5G system, and generates management data of the network function.

Currently, in the service-oriented 5G network management system, the management data generated by the MF is stored in a database corresponding to the MF, and the database corresponding to the MF does not provide an external function. In this way, management data generated by the different MFs is independent of each other. When an MF (referred to as an MF 1) needs to use management data of another MF (referred to as an MF 2), the MF 2 needs to query the management data of the MF 2 through a standardized interface between the MF 2 and a database of the MF 2, and then returns the management data to the MF 1. Consequently, management efficiency of the management data is relatively low.

To resolve the foregoing problem, a data management method applied to the 5G network management system needs to be urgently proposed.

SUMMARY

Embodiments of this application provide a data management method and an apparatus, to implement unified management of management data.

To achieve the foregoing objective, the following technical solutions are used in this application.

According to a first aspect, this application provides a data management method. The method may include: A management service function unit receives an association relationship configuration request, where the association relationship configuration request carries association information, the association information is used to configure an association relationship between a first management function unit and a first management data function unit, and the first management data function unit is configured to store management data corresponding to the first management function unit. The management service function unit receives a first query request, where the first query request carries instance information of the first management function unit or instance indication information of the first management function unit, and the first query request is used to indicate to query the first management data function unit corresponding to the first management function unit. The management service function unit determines instance information that is of the first management data function unit and that corresponds to the instance information of the first management function unit, or the management service function unit determines instance information that is of the first management data function unit and that corresponds to the instance indication information of the first management function unit.

In this application, the association relationship between the first management function unit and the first management data function unit includes an association relationship between the instance information of the first management function unit and the instance information of the first management data function unit, or an association relationship between the instance indication information of the first management function unit and the instance information of the first management data function unit.

According to the data management method provided in this application, the management service function unit may receive the association relationship configuration request, so that the association information used to configure the association relationship between the first management function unit and the first management data function unit can be stored in the management service function unit. In addition, when receiving the first query request used to indicate to query the first management data function unit corresponding to the first management function unit, the management service function unit may determine instance information of a management data function unit configured to store management data corresponding to the first management function unit, so that the first management function unit can store the management data in the first management data function unit corresponding to the instance information of the management data function unit, thereby implementing unified management of the management data.

In a first optional implementation of the first aspect, the data management method provided in this application may further include: The management service function unit sends the instance information of the first management data function unit to the first management function unit.

In this application, the management service function unit sends the instance information of the first management data function unit to the first management function unit, so that the first management function unit may store, in the first management data function unit, management data generated by the first management function unit.

According to a second aspect, a data management method is provided. The method may include: A first management function unit determines association information, where the association information includes instance information of a first management data function unit, the association information is used to configure an association relationship between the first management function unit and the first management data function unit, and the first management data function unit is configured to store management data corresponding to the first management function unit. The first management function unit sends an association relationship configuration request to a management service function unit, where the association relationship configuration request carries the association information.

In this application, the association relationship between the first management function unit and the first management data function unit includes an association relationship between instance information of the first management function unit and the instance information of the first management data function unit, or an association relationship between instance indication information of the first management function unit and the instance information of the first management data function unit.

According to the data management method provided in this application, the first management function unit may include, in the association relationship configuration request, the association information used to configure the association relationship between the first management function unit and the first management data function unit, and send the association relationship configuration request to the management service function unit. In this way, in a subsequent running process, when generating the management data, the first management function unit may obtain the instance information of the first management data function unit from the management service function unit, to store, in the first management data function unit, the management data generated by the first management data function unit.

In a first optional implementation of the second aspect, a method for determining the association information by the first management function unit may include: The first management function unit receives the instance information of the first management data function unit.

In this application, the association information may be sent by another function unit (for example, a business support system (business support system, BSS)) to the first management function unit, or may be preconfigured on the first management function unit.

In a second optional implementation of the second aspect, the data management method provided in this application may further include: The first management function unit sends a first query request to the management service function unit, where the first query request carries the instance information of the first management function unit or the instance indication information of the first management function unit, and the first query request is used to indicate to query the first management data function unit corresponding to the first management function unit. The first management function unit receives the instance information of the first management data function unit sent by the management service function unit. The first management function unit sends, to the first management data function unit, the management data corresponding to the first management function unit.

In a third optional implementation of the second aspect, the data management method provided in this application may further include: The first management function unit receives a management data query request sent by a second management function unit, where the management data query request is used to indicate to query the management data corresponding to the first management function unit. The first management function unit sends, to the second management function unit, the instance information that is of the first management data function unit and that corresponds to the first management function unit.

In this application, when the second management function unit obtains the management data corresponding to the first management function unit, the first management function unit may provide, for the second management function unit, instance information of a management data function unit that stores the management data corresponding to the first management function unit, so that the first management function unit can directly obtain, from the first management data function unit, the management data requested by the second management function unit, thereby improving management data query efficiency and ensuring real-time management data transmission.

In a fourth optional implementation of the second aspect, the data management method provided in this application may further include: The first management function unit sends a management data query request to a third management function unit, where the management data query request is used to indicate to query management data corresponding to the third management function unit. The first management function unit receives instance information that is of a second management data function unit corresponding to the third management function unit and that is sent by the third management function unit, where the second management data function unit is configured to store the management data corresponding to the third management function unit. The first management function unit sends a management data query request to the second management data function unit. The first management function unit receives the management data that corresponds to the third management function unit and that is sent by the second management data function unit.

According to a third aspect, a data management method is provided. The method may include: A first management data function unit determines association information, where the association information includes instance information of a first management function unit or instance indication information of the first management function unit, the association information is used to configure an association relationship between the first management function unit and the first management data function unit, and the first management data function unit is configured to store management data corresponding to the first management function unit. The first management data function unit sends an association relationship configuration request to a management service function unit, where the association relationship configuration request carries the association information.

In this application, the association relationship between the first management function unit and the first management data function unit includes an association relationship between the instance information of the first management function unit and instance information of the first management data function unit, or an association relationship between the instance indication information of the first management function unit and instance information of the first management data function unit.

According to the data management method provided in this application, the first management data function unit may include, in the association relationship configuration request, the association information used to configure the association relationship between the first management function unit and the first management data function unit, and send the association relationship configuration request to the management service function unit. In this way, in a subsequent running process, when generating the management data, the first management function unit may obtain the instance information of the first management data function unit from the management service function unit, to store, in the first management data function unit, the management data generated by the first management data function unit.

In a first optional implementation of the third aspect, a method for determining the association information by the first management data function unit may include: The first management data function unit receives the instance information of the first management function unit or the instance indication information of the first management function unit.

In this application, the association information may be sent by another function unit (for example, a BSS) to the first management data function unit, or may be preconfigured on the first management data function unit.

In a second optional implementation of the third aspect, the data management method provided in this application may further include: The first management data function unit receives the management data that corresponds to the first management function unit and that is sent by the first management function unit.

In this application, management data generated by a management function unit is stored in a management data function unit in a unified manner, and management data access may be implemented between different management function units. Therefore, management data corresponding to another management function unit does not need to be stored in a database corresponding to a management function unit, thereby reducing redundancy of management data in a network management system and implementing unified management of the management data.

In a third optional implementation of the third aspect, the data management method provided in this application may further include: The first management data function unit receives a management data query request sent by a second management function unit, where the management data query request is used to indicate to query the management data corresponding to the first management function unit. The first management data function unit sends, to the second management function unit, the management data corresponding to the first management function unit.

According to a fourth aspect, a data management method is provided. The method may include: A third function unit determines association information, where the association information includes instance information of a first management function unit and instance information of a first management data function unit, or the association information includes instance indication information of a first management function unit and instance information of a first management data function unit, the association information is used to configure an association relationship between the first management function unit and the first management data function unit, and the first management data function unit is configured to store management data corresponding to the first management function unit. The third function unit sends an association relationship configuration request to a management service function unit, where the association relationship configuration request carries the association information.

In this application, the third function unit may be a BSS, or may be another function unit. The association relationship between the first management function unit and the first management data function unit includes an association relationship between the instance information of the first management function unit and the instance information of the first management data function unit, or an association relationship between the instance indication information of the first management function unit and the instance information of the first management data function unit.

According to a fifth aspect, a management service function unit is provided. The management service function unit includes a receiving module and a determining module. The receiving module is configured to: receive an association relationship configuration request, where the association relationship configuration request carries association information, the association information is used to configure an association relationship between a first management function unit and a first management data function unit, and the first management data function unit is configured to store management data corresponding to the first management function unit; and receive a first query request, where the first query request carries instance information of the first management function unit or instance indication information of the first management function unit, and the first query request is used to indicate to query the first management data function unit corresponding to the first management function unit. The determining module is configured to: determine instance information that is of the first management data function unit and that corresponds to the instance information of the first management function unit; or determine instance information that is of the first management data function unit and that corresponds to the instance indication information of the first management function unit.

In this application, the association relationship between the first management function unit and the first management data function unit includes an association relationship between the instance information of the first management function unit and the instance information of the first management data function unit, or an association relationship between the instance indication information of the first management function unit and the instance information of the first management data function unit.

In a first optional implementation of the fifth aspect, the management service function unit provided in this application further includes a sending module. The sending module is configured to send the instance information of the first management data function unit to the first management function unit.

In the first aspect and the fifth aspect, the association relationship configuration request is an association relationship configuration request of the first management function unit, the association information includes the instance information of the first management data function unit.

In the first aspect and the fifth aspect, the association relationship configuration request is an association relationship configuration request of the first management data function unit, the association information is the instance information of the first management function unit or the instance indication information of the first management function unit.

In the first aspect and the fifth aspect, the association information includes the instance information of the first management function unit and the instance information of the first management data function unit; or the association information includes the instance indication information of the first management function unit and the instance information of the first management data function unit.

According to a sixth aspect, a management function unit is provided. The management function unit includes a determining module and a sending module. The determining module is configured to determine association information, where the association information includes instance information of a first management data function unit, the association information is used to configure an association relationship between a first management function unit and the first management data function unit, and the first management data function unit is configured to store management data corresponding to the first management function unit. The sending module is configured to send an association relationship configuration request to a management service function unit, where the association relationship configuration request carries the association information.

In this application, the association relationship between the first management function unit and the first management data function unit includes an association relationship between instance information of the first management function unit and the instance information of the first management data function unit, or an association relationship between instance indication information of the first management function unit and the instance information of the first management data function unit.

In a first optional implementation of the sixth aspect, the management service function unit provided in this application further includes a receiving module. The receiving module is configured to receive the instance information of the first management data function unit.

In a second optional implementation of the sixth aspect, the sending module is further configured to send a first query request to the management service function unit, the first query request carries the instance information of the first management function unit or the instance indication information of the first management function unit, and the first query request is used to indicate to query the first management data function unit corresponding to the first management function unit. The receiving module is further configured to receive the instance information of the first management data function unit sent by the management service function unit. The sending module is further configured to send, to the first management data function unit, the management data corresponding to the first management function unit.

In a third optional implementation of the sixth aspect, the receiving module is further configured to receive a management data query request sent by a second management function unit, where the management data query request is used to indicate to query the management data corresponding to the first management function unit. The sending module is further configured to send, to the second management function unit, the instance information that is of the first management data function unit and that corresponds to the first management function unit.

In a fourth optional implementation of the sixth aspect, the sending module is further configured to send a management data query request to a third management function unit, where the management data query request is used to indicate to query management data corresponding to the third management function unit. The receiving module is further configured to receive instance information that is of a second management data function unit corresponding to the third management function unit and that is sent by the third management function unit, where the second management data function unit is configured to store the management data corresponding to the third management function unit. The sending module is further configured to send a management data query request to the second management data function unit. The receiving module is further configured to receive the management data that corresponds to the third management function unit and that is sent by the second management data function unit.

According to a seventh aspect, a management data function unit is provided. The management data function unit includes a determining module and a sending module. The determining module is configured to determine association information, where the association information includes instance information of a first management function unit or instance indication information of the first management function unit, the association information is used to configure an association relationship between the first management function unit and a first management data function unit, and the first management data function unit is configured to store management data corresponding to the first management function unit. The sending module is configured to send an association relationship configuration request to a management service function unit, where the association relationship configuration request carries the association information.

In this application, the association relationship between the first management function unit and the first management data function unit includes an association relationship between the instance information of the first management function unit and instance information of the first management data function unit, or an association relationship between the instance indication information of the first management function unit and instance information of the first management data function unit.

In a first optional implementation of the seventh aspect, the management data function unit provided in this application further includes a receiving module. The receiving module is configured to receive the instance information of the first management function unit or the instance indication information of the first management function unit.

In a second optional implementation of the seventh aspect, the receiving module is further configured to receive the management data that corresponds to the first management function unit and that is sent by the first management function unit.

In a third optional implementation of the seventh aspect, the receiving module is further configured to receive a management data query request sent by a second management function unit, where the management data query request is used to indicate to query the management data corresponding to the first management function unit. The sending module is further configured to send, to the second management function unit, the management data corresponding to the first management function unit.

According to an eighth aspect, a function unit is provided. The function unit includes a determining module and a sending module. The determining module is configured to determine association information, where the association information includes instance information of a first management function unit and instance information of a first management data function unit, or the association information includes instance indication information of a first management function unit and instance information of a first management data function unit, the association information is used to configure an association relationship between the first management function unit and the first management data function unit, and the first management data function unit is configured to store management data corresponding to the first management function unit. The sending module is configured to send an association relationship configuration request to the first management data function unit, where the association relationship configuration request carries the association information.

In this application, the association relationship between the first management function unit and the first management data function unit includes an association relationship between the instance information of the first management function unit and the instance information of the first management data function unit, or an association relationship between the instance indication information of the first management function unit and the instance information of the first management data function unit.

In the first aspect to the eighth aspect, the instance information of the first management function unit includes at least one of the following: an instance identifier of the first management function unit, an Internet Protocol (Internet protocol, IP) address of an instance of the first management function unit, and a fully qualified domain name (fully qualified domain name, FQDN) of the instance of the first management function unit; or the instance indication information of the first management function unit includes at least one of the following: provider information of the first management function unit, location information of the first management function unit, and type information of a management object of the first management function unit. The instance information of the first management data function unit includes at least one of the following: an instance identifier of the first management data function unit, an IP address of the first management data function unit, and an FQDN of the first management data function unit.

In the first aspect to the eighth aspect, the management data corresponding to the first management function unit is data of the management object of the first management function unit. The data of the management object includes instance data of the management object or performance or fault data of the management object. The instance data of the management object includes at least one of the following: association data of the management object, a type of the management object, a status of the management object, a location of the management object, a capacity of the management object, an abstract feature of the management object, provider information of the management object, an ID of the management object, an IP address of the management object, and an FQDN of the management object.

According to a ninth aspect, a data management apparatus is provided. The data management apparatus includes a processor and a memory coupled to the processor. The memory is configured to store a computer instruction, and when the data management apparatus runs, the processor executes the computer instruction stored in the memory, so that the data management apparatus performs the data management method according to any one of the first aspect and the optional implementations of the first aspect.

According to a tenth aspect, a computer-readable storage medium is provided. The computer-readable storage medium includes a computer instruction. When the computer instruction is run by a processor, the data management method according to any one of the first aspect and the optional implementations of the first aspect is performed.

According to an eleventh aspect, a computer program product including an instruction is provided. When the instruction in the computer program product is run by a processor, the data management method according to any one of the first aspect and the optional implementations of the first aspect is performed.

According to a twelfth aspect, a chip is provided. The chip includes at least one processor, an input/output interface, a memory, and a bus.

The memory is configured to store a computer executable instruction. The at least one processor, the memory, and the input/output interface are connected and communicate with each other by using the bus. When the chip runs, the at least one processor executes the computer executable instruction stored in the memory, so that the chip performs the data management method according to any one of the first aspect or the optional implementations of the first aspect.

According to a thirteenth aspect, a data management apparatus is provided. The data management apparatus includes a processor and a memory coupled to the processor. The memory is configured to store a computer instruction, and when the data management apparatus runs, the processor executes the computer instruction stored in the memory, so that the data management apparatus performs the data management method according to any one of the second aspect and the optional implementations of the second aspect.

According to a fourteenth aspect, a computer-readable storage medium is provided. The computer-readable storage medium includes a computer instruction. When the computer instruction is run by a processor, the data management method according to any one of the second aspect and the optional implementations of the second aspect is performed.

According to a fifteenth aspect, a computer program product including an instruction is provided. When the instruction in the computer program product is run by a processor, the data management method according to any one of the second aspect and the optional implementations of the second aspect is performed.

According to a sixteenth aspect, a chip is provided. The chip includes at least one processor, an input/output interface, a memory, and a bus.

The memory is configured to store a computer executable instruction. The at least one processor, the memory, and the input/output interface are connected and communicate with each other by using the bus. When the chip runs, the at least one processor executes the computer executable instruction stored in the memory, so that the chip performs the data management method according to any one of the second aspect or the optional implementations of the second aspect.

According to a seventeenth aspect, a data management apparatus is provided. The data management apparatus includes a processor and a memory coupled to the processor. The memory is configured to store a computer instruction, and when the data management apparatus runs, the processor executes the computer instruction stored in the memory, so that the data management apparatus performs the data management method according to any one of the third aspect and the optional implementations of the third aspect.

According to an eighteenth aspect, a computer-readable storage medium is provided. The computer-readable storage medium includes a computer instruction. When the computer instruction is run by a processor, the data management method according to any one of the third aspect and the optional implementations of the third aspect is performed.

According to a nineteenth aspect, a computer program product including an instruction is provided. When the instruction in the computer program product is run by a processor, the data management method according to any one of the third aspect and the optional implementations of the third aspect is performed.

According to a twentieth aspect, a chip is provided. The chip includes at least one processor, an input/output interface, a memory, and a bus.

The memory is configured to store a computer executable instruction. The at least one processor, the memory, and the input/output interface are connected and communicate with each other by using the bus. When the chip runs, the at least one processor executes the computer executable instruction stored in the memory, so that the chip performs the data management method according to any one of the third aspect or the optional implementations of the third aspect.

According to a twenty-first aspect, a data management apparatus is provided. The data management apparatus includes a processor and a memory coupled to the processor. The memory is configured to store a computer instruction, and when the data management apparatus runs, the processor executes the computer instruction stored in the memory, so that the data management apparatus performs the data management method according to the fourth aspect.

According to a twenty-second aspect, a computer-readable storage medium is provided. The computer-readable storage medium includes a computer instruction. When the computer instruction is run by a processor, the data management method according to the fourth aspect is performed.

According to a twenty-third aspect, a computer program product including an instruction is provided. When the instruction in the computer program product is run by a processor, the data management method according to the fourth aspect is performed.

According to a twenty-fourth aspect, a chip is provided. The chip includes at least one processor, an input/output interface, a memory, and a bus.

The memory is configured to store a computer executable instruction. The at least one processor, the memory, and the input/output interface are connected and communicate with each other by using the bus. When the chip runs, the at least one processor executes the computer executable instruction stored in the memory, so that the chip performs the data management method according to the fourth aspect.

According to a twenty-fifth aspect, a data management system is provided. The data management system includes the management service function unit according to the fifth aspect, the management function unit according to the sixth aspect, and the management data function unit according to the seventh aspect.

DETAILED DESCRIPTION OF EMBODIMENTS

Figure 1:
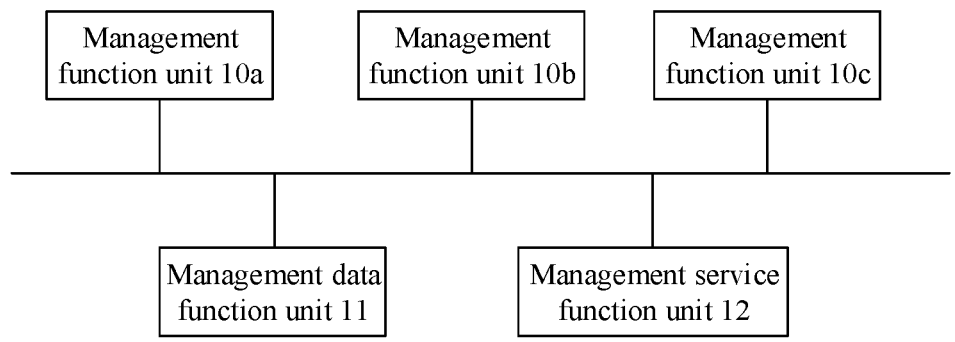
FIG. 1 is a schematic architectural diagram of a network management system according to an embodiment of the present invention.

The term "and/or" in this specification describes only an association relationship for describing associated objects and represents that three relationships may exist. For example, A and/or B may represent the following three cases: only A exists, both A and B exist, and only B exists.

In the specification and claims in embodiments of the present invention, the terms "first", "second", and the like are intended to distinguish between different objects but do not indicate a particular order of the objects. For example, a first management function unit, a second management function unit, and the like are intended to distinguish between different management function units, but do not indicate a particular order of the management function units.

In the embodiments of the present invention, the word "example" or "for example" is used to represent giving an example, an illustration, or a description. Any embodiment or design scheme described as an "example" or "for example" in the embodiments of the present invention should not be explained as being more preferred or having more advantages than another embodiment or design scheme. Exactly, use of the word "example", "for example", or the like is intended to present a relative concept in a specific manner.

In descriptions of the embodiments of the present invention, unless otherwise stated, "a plurality of" means two or more than two. For example, a plurality of processing units are two or more processing units. A plurality of systems are two or more systems.

First, some concepts related to a data management method and an apparatus provided in the embodiments of the present invention are explained.

Management function unit: In an NR system, the management function unit is a logical module that implements management functions, integrates the management functions (such as life cycle management, fault management, and performance management), and provides management services externally. The management function unit may be a management function (management function, MF). For example, a network slice management function (network slice management function, NSMF) may provide corresponding management services for all network slices (network slice) in the NR system. A network slice subnet management function (network slice subnet management function, NSSMF) may provide corresponding management services for all network slice subnets. A network function management function (network function management function, NFMF) may provide corresponding management services for all network functions (network function, NF).

Management data function unit: The management data function unit is configured to uniformly store and process management data generated by the management function unit. In the embodiments of the present invention, the management data function unit may be a management data center (management data center, MDC). The MDC may be classified into two types: a standardized management data center (standardized management data center, SMDC) and a non-standardized management data center (non-standardized management data center, Non-SMDC). The SMDC stores standardized management data, and the standardized management data may specifically include instance data of a management object of the management function unit, for example, association data of the management object, a type of the management object, a status of the management object, or a location of the management object. The non-SMDC stores performance and fault data, and the like.

Management service function unit: The management service function unit is a logical module configured to comprehensively manage all management function units in the NR system, for example, manage the NFs and the network slices. The management service function unit may be a management service management function (management service management function, MSMF). The MSMF may store instance information of another function unit. For example, the MSMF may store instance information of the management function unit or instance information of the management data function unit.

Based on the problem in the background, the embodiments of the present invention provide a data management method and an apparatus, so that association information used to configure an association relationship between a management function unit and a management data function unit may be stored in a management service function unit. In this way, when the management function unit generates management data (where the management data may be referred to as management data corresponding to the management function unit), instance information of the management data function unit configured to store the management data corresponding to the management function unit may be obtained from the management service function unit, so that the management data is stored in the management data function unit, thereby implementing unified management of the management data.

The data management method and the apparatus provided in the embodiments of the present invention may be applied to a network management system. FIG. 1 is a schematic architectural diagram of a network management system in an NR system according to an embodiment of the present invention. In FIG. 1, the network management system may include at least one management function unit (where three management function units, respectively denoted as a management function unit 10a, a management function unit 10b, and a management function unit 10c, are used as an example in FIG. 1), a management data function unit 11, and a management service function unit 12. A management data function unit 11 may include a management function unit configured to store standardized management data and a management data function unit configured to store non-standardized management data. The management service function unit 12 is configured to store related information of the management function unit and the management data function unit (for example, instance information of the management function unit and instance information of the management data function unit), and there is a correspondence between the management function unit and the management data function unit. Using the management function unit 10a as an example, a management object of the management function unit 10a may be any type of network function, network slice, or the like. Instance information and performance and fault data that are of the management object of the management function unit 10a and that are generated by the management function unit 10a are referred to as management data corresponding to the management function unit 10a. The management function unit 10a may obtain, through the management service function unit 12, a management data function unit (for example, the management data function unit 11 in FIG. 1) that can store the management data corresponding to the management function unit 10a, and store the management data in the management data function unit 11, thereby implementing unified management of the management data.

Figure 2:
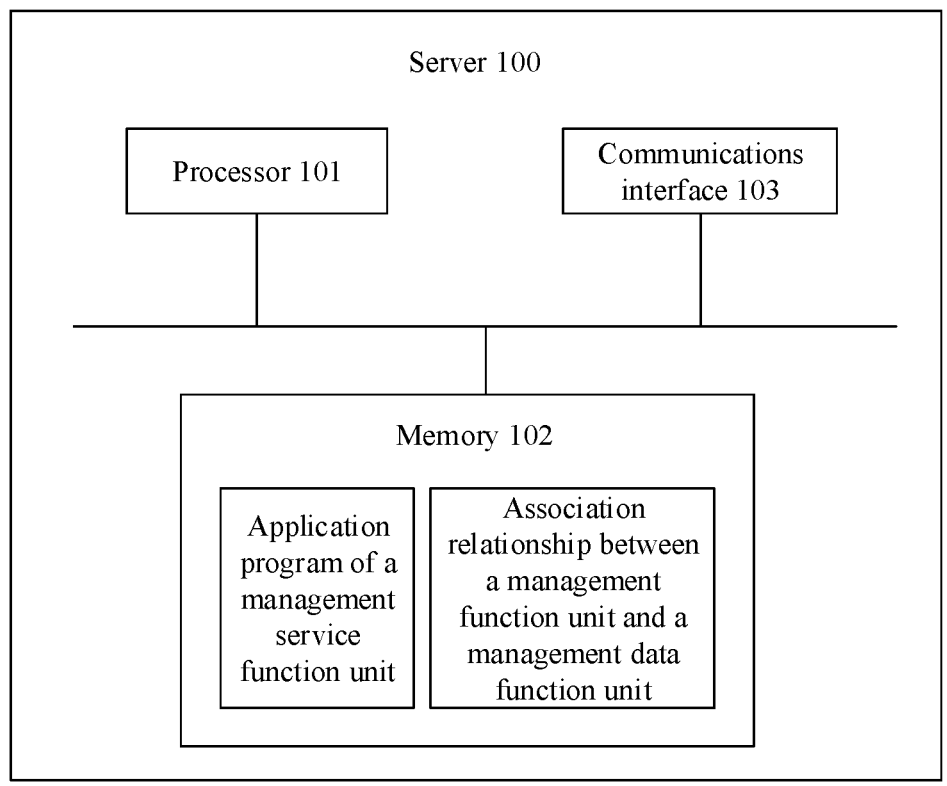
FIG. 2 is a schematic diagram of hardware of a server integrating a management service function unit according to an embodiment of the present invention.

In this embodiment of the present invention, the management service function unit may be integrated into a server to implement a function of the management service function unit. With reference to FIG. 2, the following describes in detail components of a server 100 integrating a management service function unit according to an embodiment of the present invention. As shown in FIG. 2, the server 100 may include a processor 101, a memory 102, a communications interface 103, and the like.

The processor 101 is a core component of the server 100, and is configured to run an operating system of the server 100 and an application program (including a system application program and a third-party application program) in the server 100. In this embodiment of the present invention, the processor 101 may determine the management data function unit corresponding to the management function unit.

In this embodiment of the present invention, the processor 101 may be specifically a central processing unit (central processing unit, CPU), a general purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor 101 can implement or execute various example logical blocks, modules, and circuits described with reference to the content disclosed in the embodiments of the present invention. Alternatively, the processor may be a combination for implementing a computing function, for example, a combination including one or more microprocessors or a combination of a DSP and a microprocessor.

The memory 102 may be configured to store a software program and a module. The processor 101 runs the software program and the module that are stored in the memory 102, to execute various function applications of the server 100 and process data. The memory 102 may include one or more computer-readable storage media. The memory 102 includes a program storage area and a data storage area. The program storage area may store an operating system, an application program required by at least one function (for example, an application program of the management service function unit), and the like. The data storage area may store data created by the server 100, and the like. In this embodiment of the present invention, the memory 102 may further store an association relationship between the management function unit and the management data function unit.

In this embodiment of the present invention, the memory 102 may specifically include a volatile memory (volatile memory), for example, a random access memory (random-access memory, RAM); or may include a non-volatile memory (non-volatile memory), for example, a read-only memory (read-only memory, ROM), a flash memory (flash memory), a hard disk drive (hard disk drive, HDD), or a solid-state drive (solid-state drive, SSD); or may include a combination of the foregoing types of memories.

The communications interface 103 is an interface circuit used by the server 100 to communicate with another device. The communications interface may be a component having a transceiver function, such as a transceiver or a transceiver circuit. For example, by using the communications interface 103, the management service function unit may receive an association relationship configuration request of the management function unit or the management data function unit, and respond to the association relationship configuration request.

Figure 3:
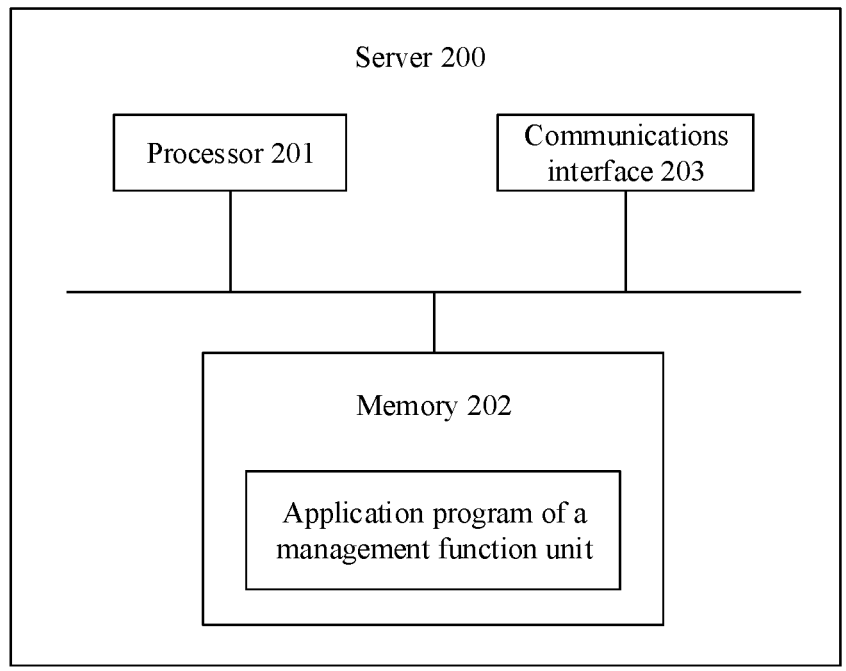
FIG. 3 is a schematic diagram of hardware of a server integrating a management function unit according to an embodiment of the present invention.

In this embodiment of the present invention, the management function unit may be integrated into a server to implement a function of the management function unit. With reference to FIG. 3, the following describes in detail components of a server 200 integrating a management function unit according to an embodiment of the present invention. As shown in FIG. 3, the server 200 may include a processor 201, a memory 202, a communications interface 203, and the like.

The processor 201 is a core component of the server 200, and is configured to run an operating system of the server 200 and an application program (including a system application program and a third-party application program) in the server 200. For example, in a running process, the processor 201 may generate instance information of a management object of the management function unit, that is, may generate management data.

In this embodiment of the present invention, the processor 201 may be specifically a CPU, a general purpose processor, a DSP, an ASIC, an FPGA or another programmable logic device, a transistor logic device, a hardware component, or any combination thereof. The processor 201 can implement or execute various example logical blocks, modules, and circuits described with reference to the content disclosed in the embodiments of the present invention. Alternatively, the processor may be a combination for implementing a computing function, for example, a combination including one or more microprocessors or a combination of a DSP and a microprocessor.

The memory 202 may be configured to store a software program and a module. The processor 201 runs the software program and the module that are stored in the memory 202, to execute various function applications of the server 200 and process data. The memory 202 may include one or more computer-readable storage media. The memory 202 includes a program storage area and a data storage area. The program storage area may store an operating system, an application program required by at least one function (for example, an application program of the management function unit), and the like. The data storage area may store data created by the server 200, and the like. In this embodiment of the present invention, the memory 202 may temporarily store the management data generated by the management function unit.

In this embodiment of the present invention, the memory 202 may specifically include a volatile memory, for example, a RAM; or may include a non-volatile memory, for example, a ROM, a flash memory, an HDD, or an SSD; or may include a combination of the foregoing types of memories.

The communications interface 203 is an interface circuit used by the server 200 to communicate with another device. The communications interface may be a component having a transceiver function, such as a transceiver or a transceiver circuit. For example, by using the communications interface 203, the management function unit may write the management data to a management data function unit, or may send, to a management data function unit, a request for deleting, reading, or updating the management data.

Figure 4:
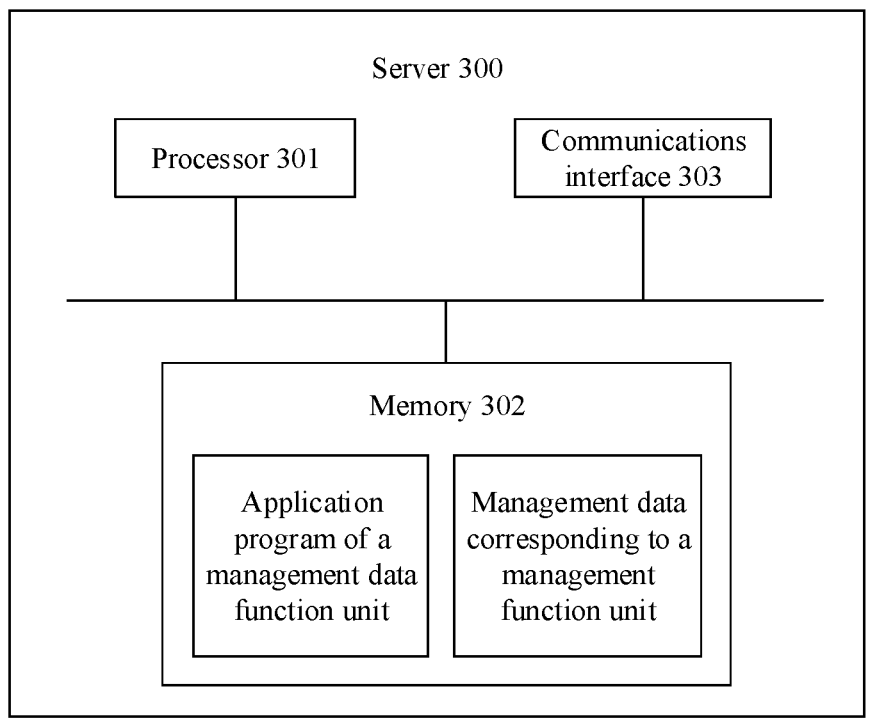
FIG. 4 is a schematic diagram of hardware of a server integrating a management data function unit according to an embodiment of the present invention.

In this embodiment of the present invention, the management data function unit may be integrated into a server to implement a function of the management data function unit. With reference to FIG. 4, the following describes in detail components of a server 300 integrating a management data function unit according to an embodiment of the present invention. As shown in FIG. 4, the server 300 may include a processor 301, a memory 302, a communications interface 303, and the like.

The processor 301 is a core component of the server 300, and is configured to run an operating system of the server 300 and an application program (including a system application program and a third-party application program) in the server 300. For example, in a running process, the processor 301 may perform processing such as update or deletion on the management data stored in the management data function unit.

In this embodiment of the present invention, the processor 301 may be specifically a CPU, a general purpose processor, a DSP, an ASIC, an FPGA or another programmable logic device, a transistor logic device, a hardware component, or any combination thereof. The processor 301 can implement or execute various example logical blocks, modules, and circuits described with reference to the content disclosed in the embodiments of the present invention. Alternatively, the processor may be a combination for implementing a computing function, for example, a combination including one or more microprocessors or a combination of a DSP and a microprocessor.

The memory 302 may be configured to store a software program and a module. The processor 301 runs the software program and the module that are stored in the memory 302, to execute various function applications of the server 300 and process data. The memory 302 may include one or more computer-readable storage media. The memory 302 includes a program storage area and a data storage area. The program storage area may store an operating system, an application program required by at least one function (for example, an application program of the management data function unit), and the like. The data storage area may store data created by the server 300, and the like. In this embodiment of the present invention, the memory 302 stores management data corresponding to a management function unit, namely, data of a management object of the management function unit (including instance data of the management object or performance or fault data of the management object).

In this embodiment of the present invention, the memory 302 may specifically include a volatile memory, for example, a RAM; or may include a non-volatile memory, for example, a ROM, a flash memory, an HDD, or an SSD; or may include a combination of the foregoing types of memories.

The communications interface 303 is an interface circuit used by the server 300 to communicate with another device. The communications interface may be a component having a transceiver function, such as a transceiver or a transceiver circuit. For example, by using the communications interface 303, the management data function unit may receive a query request sent by another function unit, and return management data requested by the management data function unit to another management function unit.

Optionally, the management service function unit, the management function unit, and the management data function unit may be respectively integrated into different servers, or may be integrated into a same server. This is specifically determined according to an actual situation, and is not limited in the embodiments of the present invention.

In the following embodiments, the management service function unit may be an MSMF, the management function unit may be an MF or an MS, and the management data function unit may be an MDC (where the MDC may include a plurality of SMDCs and a plurality of non-SMDCs).

Figure 5:
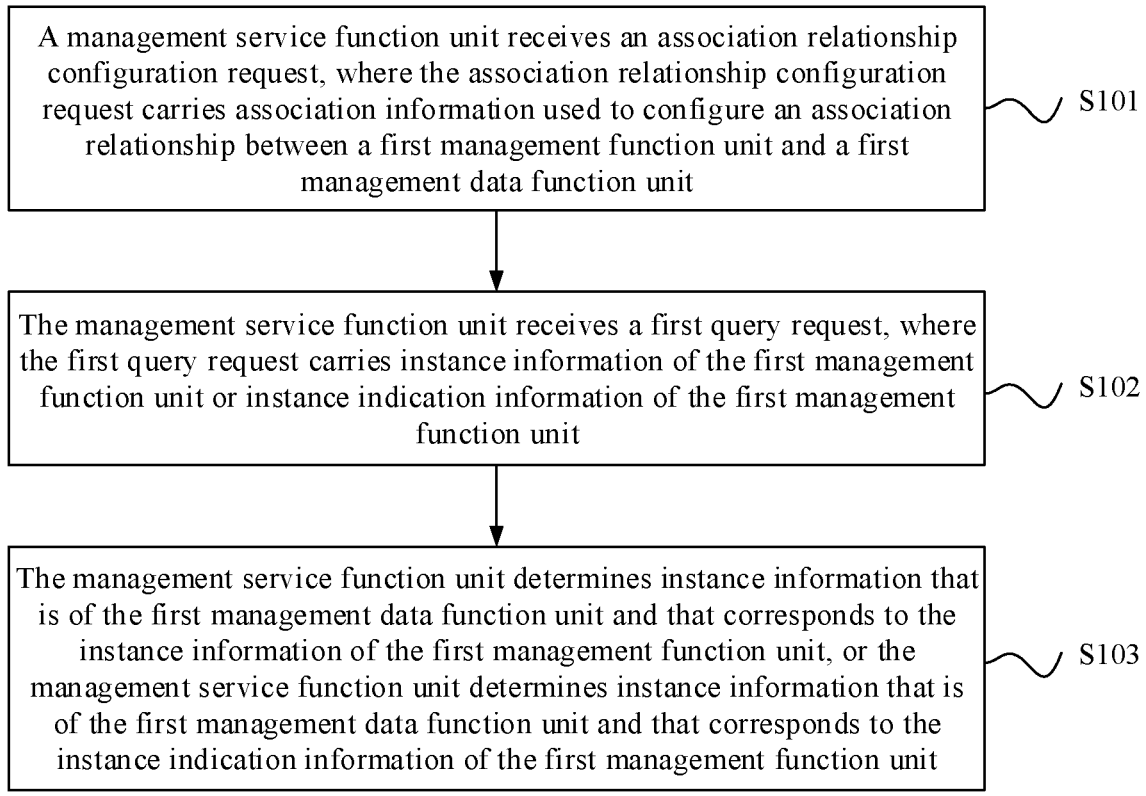
FIG. 5 is a first schematic diagram of a data management method according to an embodiment of the present invention.

With reference to the network management system, as shown in FIG. 5, a data management method provided in an embodiment of the present invention may include S101 to S103.

S101: A management service function unit receives an association relationship configuration request, where the association relationship configuration request carries association information used to configure an association relationship between a first management function unit and a first management data function unit.

The first management data function unit is configured to store management data corresponding to the first management function unit.

The association information may include instance information of the first management function unit or instance indication information of the first management function unit. The association information may include instance information of the first management data function unit. Alternatively, the association information may include instance information of the first management function unit and instance information of the first management data function unit, or may include instance indication information of the first management function unit and instance information of the first management data function unit.

In this embodiment of the present invention, the association relationship configuration request received by the management service function unit may be a registration or update request of a function unit (for example, a management function unit or a management data function unit) on the management service function unit. After receiving the association relationship configuration request, the management service function unit may store the association information in the association relationship configuration request, so that configuration of the association relationship between the first management function unit and the first management data function unit is completed. The association relationship between the first management function unit and the first management data function unit includes an association relationship between the instance information of the first management function unit and the instance information of the first management data function unit, or an association relationship between the instance indication information of the first management function unit and the instance information of the first management data function unit.

In this embodiment of the present invention, the instance information of the first management function unit includes at least one of the following: an instance identifier of the first management function unit (which may be an instance ID of the first management function unit), an IP address of an instance of the first management function unit, and an FQDN of the instance of the first management function unit. The instance indication information of the first management function unit includes at least one of the following: provider information of the first management function unit, location information of the first management function unit, and type information of a management object of the first management function unit.

Optionally, in this embodiment of the present invention, the management object of the first management function unit (namely, an object managed by the first management function unit) may be a network function, a network, a network slice, a network slice sub-network, or the like.

In this embodiment of the present invention, the instance information of the first management data function unit includes at least one of the following: an instance identifier of the first management data function unit, an IP address of the first management data function unit, and an FQDN of the first management data function unit.

The following Table 1 shows an example of the association relationship between the first management function unit and the first management data function unit.

TABLE 1

| ID of a first management function unit | ID of a first management data function unit |
|---|---|
| IP address of an instance of a first management function unit | IP address of a first management data function unit |
| Type information of a management object of a first management function unit | FQDN of a first management data function unit |
| Location information of a first management function unit | ID of a first management data function unit |

In the example in Table 1, the association relationship between the first management function unit and the first management data function unit includes a correspondence between the ID of the first management function unit and the ID of the first management data function unit, a correspondence between the IP address of the instance of the first management function unit and the IP address of the first management data function unit, a correspondence between the type information of the management object of the first management function unit and the FQDN of the first management data function unit, or the like.

S102: The management service function unit receives a first query request, where the first query request carries the instance information of the first management function unit or the instance indication information of the first management function unit.

The first query request is used to indicate to query the first management data function unit corresponding to the first management function unit.

S103: The management service function unit determines the instance information that is of the first management data function unit and that corresponds to the instance information of the first management function unit, or the management service function unit determines the instance information that is of the first management data function unit and that corresponds to the instance indication information of the first management function unit.

In this embodiment of the present invention, the management service function unit may receive a plurality of association relationship configuration requests, so that the management service function unit may store association relationships between a plurality of management function units and a plurality of management data function units. For example, it is assumed that the management function units are in a one-to-one correspondence with the management data function units. Using an example in which instance information of the management function unit is an instance identifier of the management function unit and instance information of the management data function unit is an instance identifier of the management data function unit, the following Table 2 shows an example of the association relationship between the management function unit and the management data function unit.

TABLE 2

| Instance identifier of a management function unit | Instance identifier of a management data function unit |
|---|---|
| MF 1 | MDC 5 |
| MF 2 | MDC 4 |

TABLE 2-continued

| Instance identifier of a management function unit | Instance identifier of a management data function unit |
|---|---|
| MF 3 | MDC 3 |
| MF 4 | MDC 2 |

The first query request is used to query a management data function unit that can store the management data corresponding to the first management function unit. In S101, the management service function unit completes, based on the association information in the association relationship configuration request, the configuration of the association relationship between the first management function unit and the first management data function unit. Therefore, the management service function unit may determine the instance information of the first management data function unit based on the instance information of the first management function unit and the association relationship between the instance information of the first management function unit and the instance information of the first management data function unit, that is, determine the management data function unit that can store the management data corresponding to the first management function unit; or may determine the instance information of the first management data function unit based on the instance indication information of the first management function unit and the association relationship between the instance information of the first management function unit and the instance information of the first management data function unit.

According to the foregoing steps, when the first query request carries an instance identifier of a management function unit, an IP address of a management function unit, or an FQDN of an instance of a management function unit, the management service function unit may determine that the first management data function unit can maintain and manage management data that corresponds to the management function unit corresponding to the instance identifier, the IP address, or the FQDN. When the first query request carries provider information of a management function unit, the management service function unit may determine that the first management data function unit can maintain and manage management data that corresponds to the management function unit corresponding to the provider information. When the first query request carries location information of a management function unit, the management service function unit may determine that the first management data function unit can maintain and manage management data that corresponds to the management function unit corresponding to the location information. When the first query request carries type information of a management object of a management function unit, the management service function unit may determine that the first management data function unit can maintain and manage management data that corresponds to the management function unit corresponding to the type information of the management object (for example, if a type of the management object is a network function, a first management data function unit can maintain and manage management data corresponding to the network function).

Figure 6:
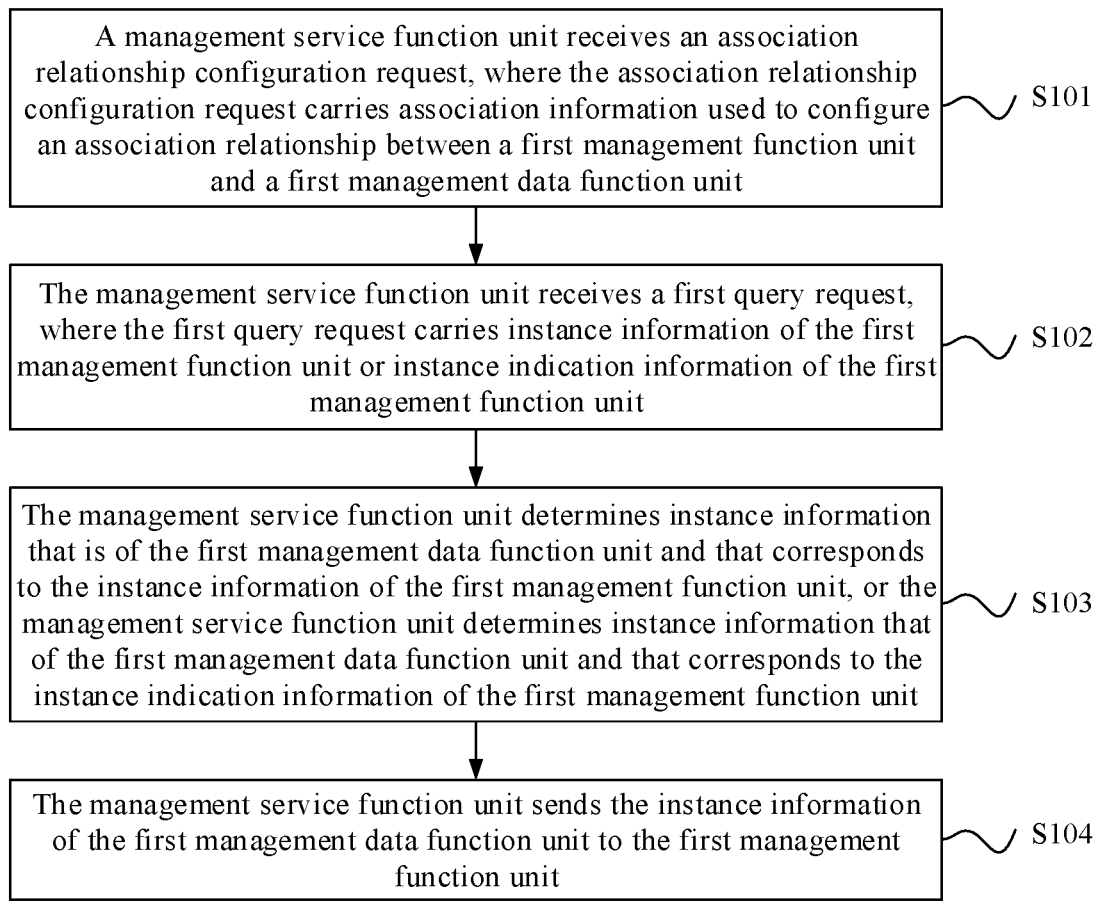
FIG. 6 is a second schematic diagram of a data management method according to an embodiment of the present invention.

Optionally, with reference to FIG. 5, as shown in FIG. 6, after S103, the data management method provided in this embodiment of the present invention may further include S104.

S104: The management service function unit sends the instance information of the first management data function unit to the first management function unit.

In this embodiment of the present invention, the management service function unit may send the instance information of the first management data function unit determined by the management service function unit to the first management function unit, so that the first management function unit may store, in the first management data function unit, management data generated by the first management function unit.

According to the data management method provided in this embodiment of the present invention, the management service function unit receives the association relationship configuration request, so that the association information carried in the association relationship configuration request can be stored in the management service function unit, thereby completing the configuration of the association relationship between the first management function unit and the first management data function unit. In addition, when receiving the first query request, the management service function unit may determine instance information of the management data function unit configured to store the management data corresponding to the first management function unit, so that the first management function unit can store the management data in the first management data function unit corresponding to the instance information of the management data function unit, thereby implementing unified management of the management data.

It should be noted that, in this embodiment of the present invention, the association relationship configuration request may be an association relationship configuration request of the first management function unit or an association relationship configuration request of the first management data function unit. In the following embodiments, the association relationship configuration request is an association relationship configuration request of different function units. From this perspective, the data management method provided in this embodiment of the present invention is described in detail.

Figure 7:
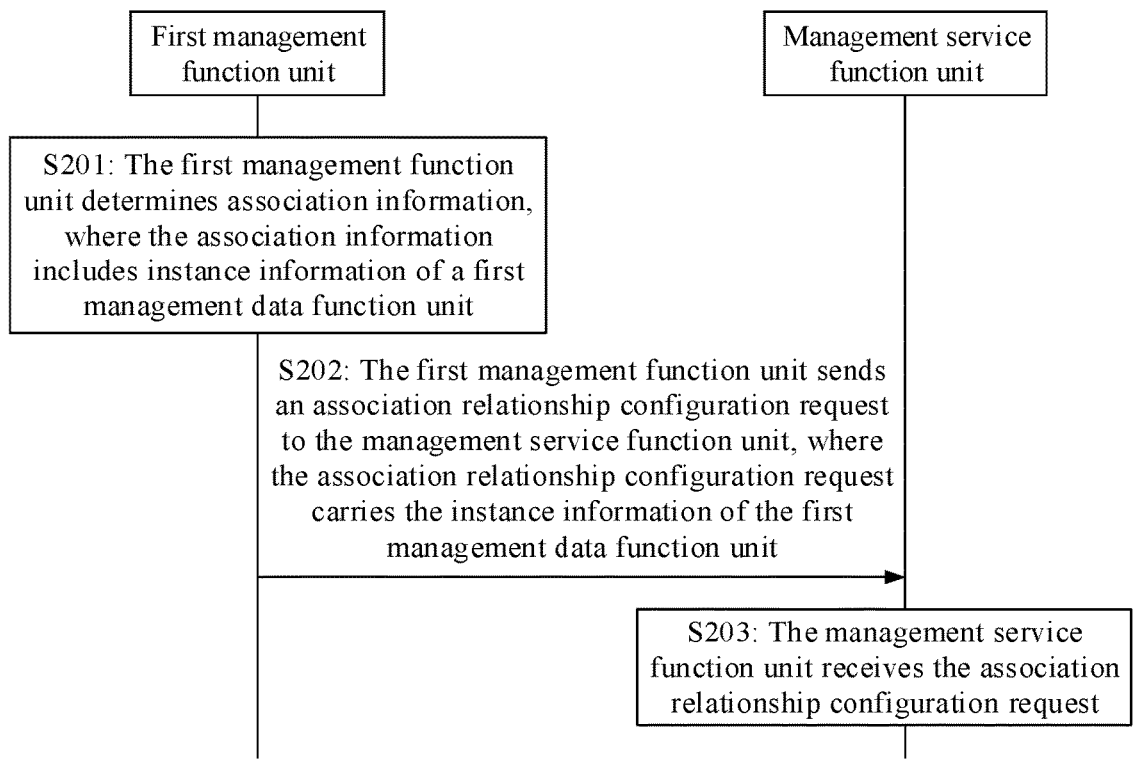
FIG. 7 is a third schematic diagram of a data management method according to an embodiment of the present invention.

First, when the association relationship configuration request is the association relationship configuration request of the first management function unit, as shown in FIG. 7, a data management method provided in an embodiment of the present invention may include S201 to S203.

S201: A first management function unit determines association information, where the association information includes instance information of a first management data function unit.

The association information is used to configure an association relationship between the first management function unit and the first management data function unit.

In this embodiment of the present invention, the first management data function unit is a management data function unit corresponding to the first management function unit, and may store management data corresponding to the first management function unit. A method for determining the association information by the first management function unit may include: The first management function unit receives the instance information of the first management data function unit. Specifically, the first management function unit may receive the instance information of the first management data function unit from another function unit (for example, a function unit that manages the first management function unit).

Optionally, in this embodiment of the present invention, the instance information of the first management data function unit may alternatively be preconfigured on the first management function unit.

It should be noted that, in this embodiment of the present invention, there may be one or more first management data function units corresponding to the first management function unit. Specifically, a quantity of first management data function units may be determined based on an actual use requirement. This is not limited in this embodiment of the present invention.

In this embodiment of the present invention, if there is an association relationship between one management function unit and a plurality of management data function units, and each management data function unit may store one or more types of management data, a type of management data needs to be processed in a corresponding management data function unit. For example, management data of a network function type is stored in a management data function unit 1, and management data of a network slice type is stored in a management data function unit 2.

Optionally, in this embodiment of the present invention, the first management function unit may be a management function unit having a management function, or may be a management function unit integrating a plurality of management functions. This is not specifically limited in this embodiment of the present invention.

S202: The first management function unit sends an association relationship configuration request to a management service function unit, where the association relationship configuration request carries the instance information of the first management data function unit.

Optionally, in this embodiment of the present invention, the association relationship configuration request sent by the first management function unit may alternatively include instance information of the first management function unit or instance indication information of the first management function unit.

For specific descriptions of the instance information of the first management function unit, the instance indication information of the first management function unit, and the instance information of the first management data function unit, refer to the related descriptions in S101. Details are not described herein again.

S203: The management service function unit receives the association relationship configuration request.

In this embodiment of the present invention, the management service function unit receives the association relationship configuration request sent by the first management function unit. Because instance information of a management data function unit in the association relationship configuration request is the instance information that is of the first management data function unit and that corresponds to the first management function unit, the management service function unit may determine that there is the association relationship between the first management function unit and the first management data function unit, so that the management service function unit stores the instance information of the first management data function unit, that is, completes configuration of the association relationship between the first management function unit and the first management data function unit.

For descriptions of the association relationship between the first management function unit and the first management data function unit, refer to the related descriptions in S101. Details are not described herein again.

Optionally, in this embodiment of the present invention, the association relationship configuration request may alternatively be sent by another function unit to the management service function unit, for example, sent by a BSS to the management service function unit. In this way, the association information in the association relationship configuration request includes the instance information of the first management function unit and the instance information of the first management data function unit; or includes the instance indication information of the first management function unit and the instance information of the first management data function unit.

According to the data management method provided in this embodiment of the present invention, the first management function unit may include, in the association relationship configuration request, the association information used to configure the association relationship between the first management function unit and the first management data function unit, and send the association relationship configuration request to the management service function unit. In this way, in a subsequent running process, when generating the management data, the first management function unit may obtain the instance information of the first management data function unit from the management service function unit, to store, in the first management data function unit, the management data generated by the first management function unit.

Figure 8:
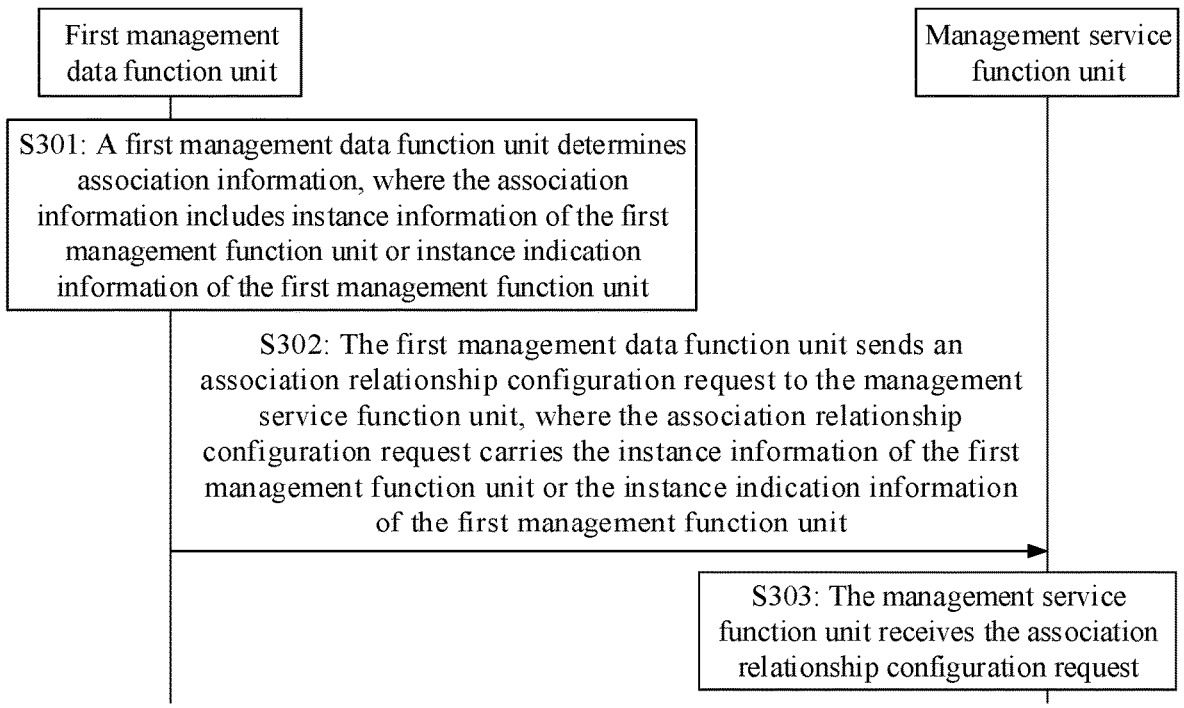
FIG. 8 is a fourth schematic diagram of a data management method according to an embodiment of the present invention.

Second, when the association relationship configuration request is the association relationship configuration request of the first management data function unit, as shown in FIG. 8, a data management method provided in an embodiment of the present invention may include S301 to S303.

S301: The first management data function unit determines association information, where the association information includes instance information of a first management function unit or instance indication information of the first management function unit.

The association information is used to configure an association relationship between the first management function unit and the first management data function unit.

In this embodiment of the present invention, the first management function unit is a management function unit corresponding to the first management data function unit, and may store management data corresponding to the first management function unit. A method of determining the instance information of the first management function unit or the instance indication information of the first management function unit by the first management data function unit may include: The first management data function unit receives the instance information of the first management function unit or the instance indication information of the first management function unit. Specifically, the first management function unit may receive the instance information of the first management function unit or the instance indication information of the first management function unit from another function unit (for example, a function unit that manages the first management data function unit).

Optionally, in this embodiment of the present invention, the instance information of the first management function unit or the instance indication information of the first management function unit may alternatively be preconfigured on the first management data function unit.

It should be noted that, in this embodiment of the present invention, there may be one or more first management function units corresponding to the first management data function unit. Specifically, a quantity of first management function units may be determined based on an actual use requirement. This is not limited in this embodiment of the present invention.

S302: The first management data function unit sends an association relationship configuration request to a management service function unit, where the association relationship configuration request carries the instance information of the first management function unit or the instance indication information of the first management function unit.

Optionally, in this embodiment of the present invention, the association relationship configuration request sent by the first management function unit may alternatively include instance information of the first management data function unit.

For specific descriptions of the instance information of the first management function unit, the instance indication information of the first management function unit, and the instance information of the first management data function unit, refer to the related descriptions in S101. Details are not described herein again.

S303: The management service function unit receives the association relationship configuration request.

In this embodiment of the present invention, the management service function unit receives the association relationship configuration request sent by the first management data function unit. Because instance information of a management function unit in the association relationship configuration request is the instance information of the first management function unit corresponding to the first management data function unit, or instance indication information of a management function unit in the association relationship configuration request is the instance indication information of the first management function unit corresponding to the first management data function unit, the management service function unit may determine that there is an association relationship between the first management function unit and the first management data function unit, so that the management service function unit stores the instance information of the first management function unit or the instance indication information of the first management function unit, that is, completes configuration of the association relationship between the first management function unit and the first management data function unit.

For descriptions of the association relationship between the first management function unit and the first management data function unit, refer to the related descriptions in S101. Details are not described herein again.

Optionally, similar to S203, in this embodiment of the present invention, the association relationship configuration request may alternatively be sent by another function unit to the management service function unit, for example, sent by a BSS to the management service function unit. In this way, the association information in the association relationship configuration request includes the instance information of the first management function unit and the instance information of the first management data function unit; or includes the instance indication information of the first management function unit and the instance information of the first management data function unit.

According to the data management method provided in this embodiment of the present invention, the first management data function unit may include, in the association relationship configuration request, the association information used to configure the association relationship between the first management function unit and the first management data function unit, and send the association relationship configuration request to the management service function unit. In this way, in a subsequent running process, when generating the management data, the first management function unit may obtain the instance information of the first management data function unit from the management service function unit, to store, in the first management data function unit, the management data generated by the first management data function unit.

In conclusion, S201 to S203 describe a registration or update process of the first management function unit on the management service function unit, and the configuration of the association relationship between the first management function unit and the first management data function unit may be completed by performing S201 to S203. S301 to S303 describe a registration or update process of the first management data function unit on the management service function unit, and the configuration of the association relationship between the first management function unit and the first management data function unit may be completed by performing S301 to S303.

Optionally, in this embodiment of the present invention, the configuration of the association relationship between the first management function unit and the first management data function unit may be implemented by performing either of the methods described in S201 to S203 and S301 to S303. Specifically, the method may be selected according to an actual situation. This is not limited in the embodiments of the present invention.

In this embodiment of the present invention, because there is an association relationship between a management function unit and a management data function unit, the management function unit may interact with the management data function unit. Management data generated by the management function unit is written into the management data function unit, and an operation such as reading, updating, or deleting may be performed on the management data.

Figure 9:
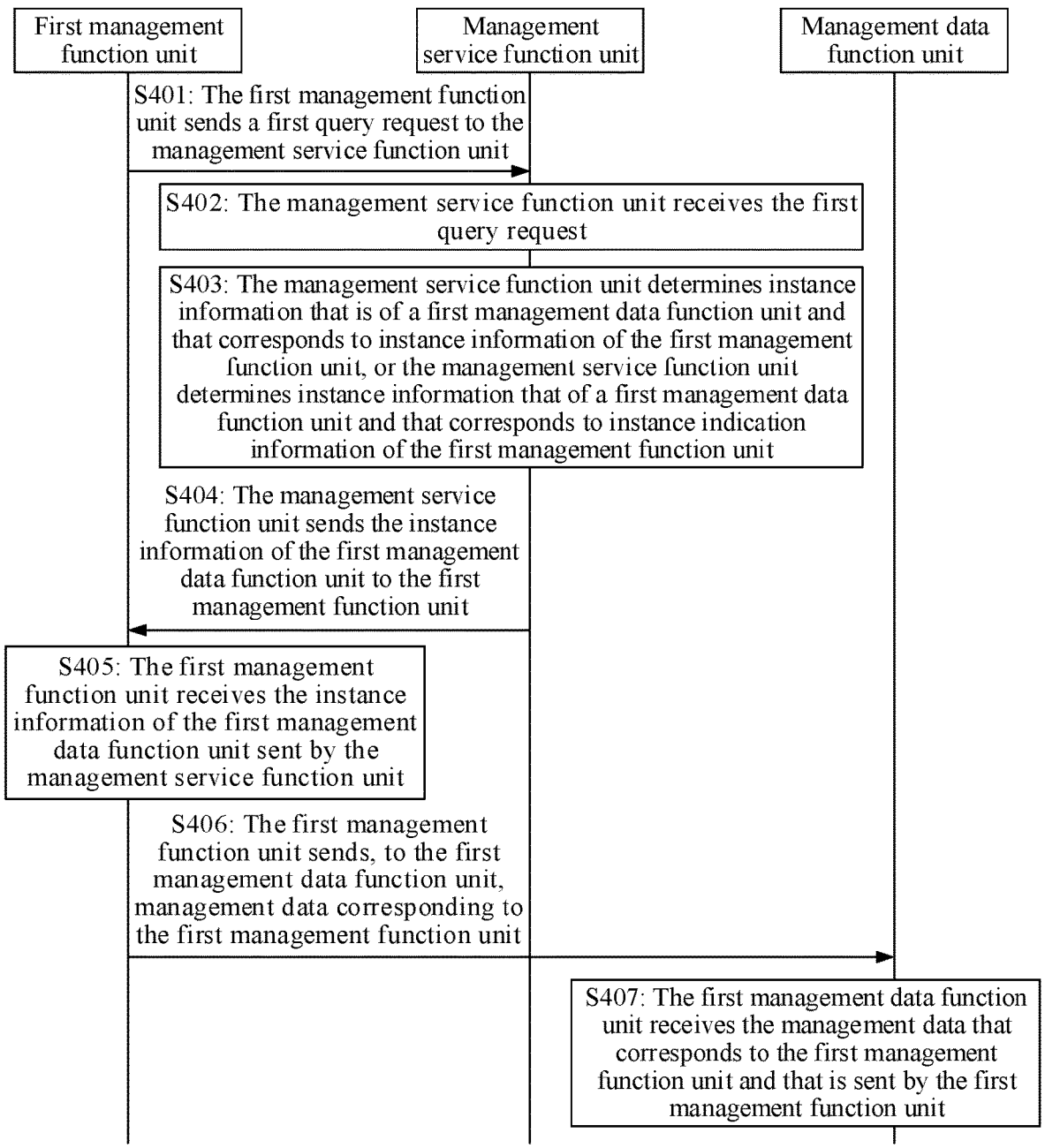
FIG. 9 is a fifth schematic diagram of a data management method according to an embodiment of the present invention.

Specifically, based on S201 to S203 or S301 to S303, when generating the management data, the first management function unit may store the management data in the first management data function unit that has an association relationship with the first management function unit. As shown in FIG. 9, the data management method provided in the embodiments of the present invention may include S401 to S407.

S401: The first management function unit sends a first query request to the management service function unit.

The first query request carries the instance information of the first management function unit or the instance indication information of the first management function unit, and the first query request is used to indicate to query the first management data function unit corresponding to the first management function unit.

In this embodiment of the present invention, in a working process, the first management function unit generates data of a management object of the first management function unit (namely, the management data corresponding to the first management function unit), and needs to store the management data in the management data function unit, to facilitate subsequent analysis and processing of the management data. In this case, the first management function unit sends the first query request to the management service function unit, to query a management data function unit that can be configured to store the management data corresponding to the first management function unit, so that the management data is stored in the corresponding management data function unit.

For example, if the management data generated by the first management function unit is management data corresponding to a management object (which may be referred to as a management object 1) of the first management function unit, the first query request carries the instance indication information of the first management function unit, and the instance indication information of the first management function unit is type information of the management object 1 of the first management function unit.

S402: The management service function unit receives the first query request.

S403: The management service function unit determines the instance information that is of the first management data function unit and that corresponds to the instance information of the first management function unit, or the management service function unit determines the instance information that is of the first management data function unit and that corresponds to the instance indication information of the first management function unit.

S404: The management service function unit sends the instance information of the first management data function unit to the first management function unit.

For specific descriptions of S402 and S403, refer to the related descriptions of S102 and S103 in the foregoing embodiment. Details are not described herein again.

S405: The first management function unit receives the instance information of the first management data function unit sent by the management service function unit.

S406: The first management function unit sends, to the first management data function unit, the management data corresponding to the first management function unit.

In this embodiment of the present invention, the management data corresponding to the first management function unit is the data of the management object (namely, an object managed by the first management function unit) of the first management function unit. The data of the management object includes instance data of the management object or performance or fault data of the management object. The instance data of the management object includes at least one of the following: association data of the management object, a type of the management object, a status of the management object, a location of the management object, a capacity of the management object, an abstract feature of the management object, provider information of the management object, an ID of the management object, an IP address of the management object, and an FQDN of the management object. The instance data of the management object belongs to standardized management data, and may be stored in a standardized management data function unit. The performance or fault data of the management object belongs to non-standardized management data, and may be stored in a non-standardized management data function unit.

For example, the association data of the management object may be instance association data between a network function management object instance 1 and a virtualized network function instance 1, or instance association data between a network slice sub-network instance 1 and a network slice sub-network instance 2. Examples are not listed one by one herein. The type of the management object is a type of a management object instance. For example, the management object instance is a management object in a core network or a management object in an access network. The abstract feature of the management object includes delay information and bandwidth information. The provider information of the management object includes provider and version information of the management object.

Optionally, in this embodiment of the present invention, if there are a plurality of first management data function units determined by the management service function unit, to be specific, the first management function unit receives instance information that is of the plurality of first management data function units and that is sent by the management service function unit, the first management function unit may select one management data function unit from the plurality of first management data function units, to store the management data corresponding to the first management function unit.

In an implementation, the first management function unit may select, from the plurality of first management data function units, a first management data function unit that has largest storage space to store the management data corresponding to the first management function unit, or may select a first management data function unit based on an actual use requirement. This is not limited in this embodiment of the present invention.

S407: The first management data function unit receives the management data that corresponds to the first management function unit and that is sent by the first management function unit.

Figure 10:
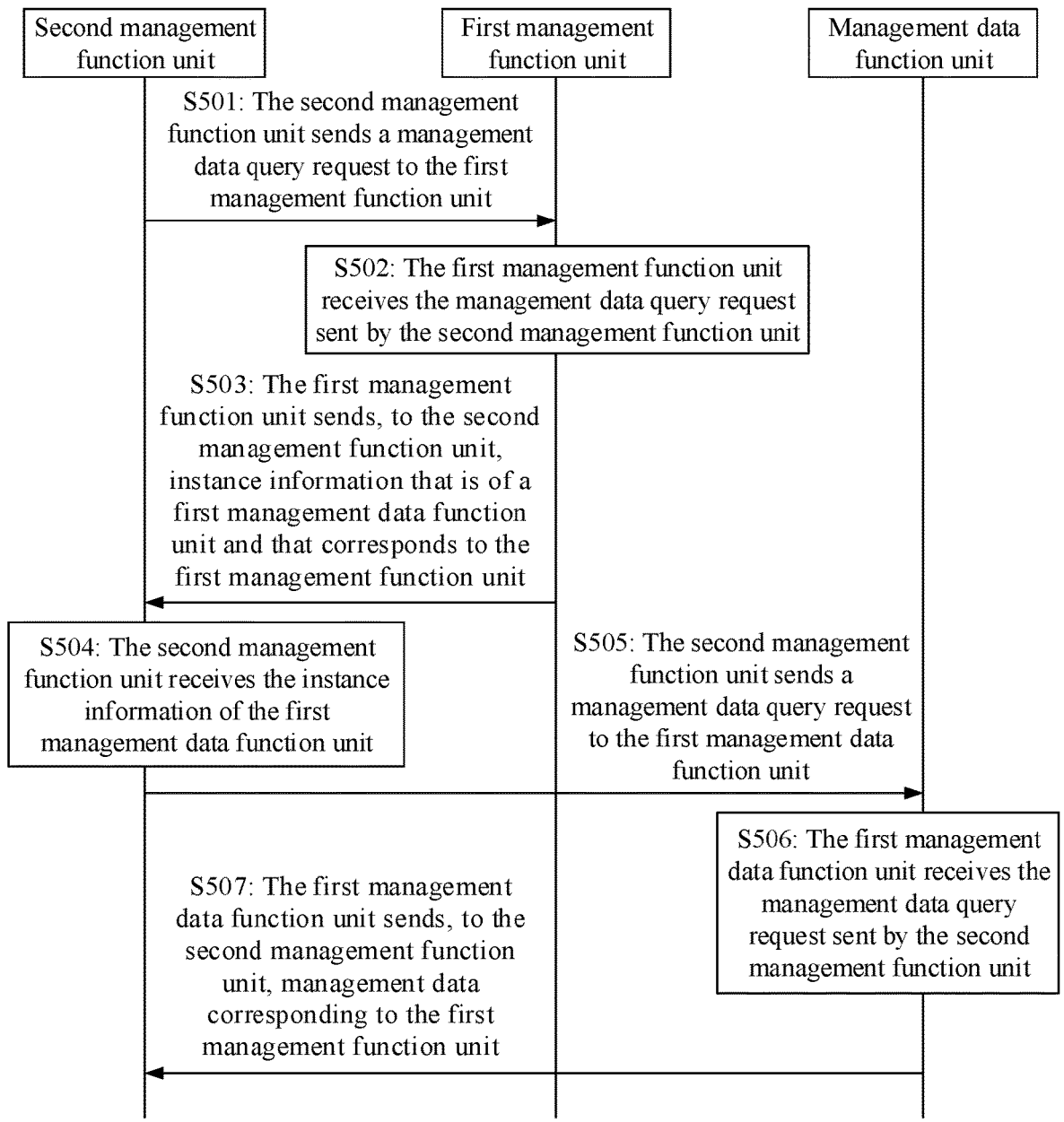
FIG. 10 is a sixth schematic diagram of a data management method according to an embodiment of the present invention.

After the management data generated by the management function unit is stored in the corresponding management data function unit by performing the foregoing steps, management data access may be implemented between different management function units. Specifically, as shown in FIG. 10, the data management method provided in the embodiments of the present invention may include S501 to S507.

S501: A second management function unit sends a management data query request to the first management function unit.

The management data query request is used to indicate to query the management data corresponding to the first management function unit.

That the management data query request carries type information of management data requested by the second management function unit may be understood as: The second management function unit needs to request a type of management data in the management data corresponding to the first management function unit. For example, the second management function unit requests instance information of a network slice (where the network slice is the management object of the first management function unit) in the management data corresponding to the first management function unit, or fault data in the management data corresponding to the first management function unit.

S502: The first management function unit receives the management data query request sent by the second management function unit.

S503: The first management function unit sends, to the second management function unit, the instance information that is of the first management data function unit and that corresponds to the first management function unit.

In this embodiment of the present invention, the first management function unit may determine, based on the type information of the management data carried in the management data query request, a management data function unit in which the management data that is requested by the second management function unit and that is in the management data corresponding to the first management function unit is stored, that is, determine a management data function unit (for example, the first management data function unit) in which the management data requested by the second management function unit is stored. Then, the first management function unit returns the instance information of the first management data function unit to the second management function unit.

S504: The second management function unit receives the instance information of the first management data function unit.

S505: The second management function unit sends a management data query request to the first management data function unit.

In this embodiment of the present invention, after receiving the instance information of the first management data function unit sent by the first management function unit, the second management function unit may send the management data query request to the first management data function unit corresponding to the instance information, to obtain the management data requested by the second management function unit in S501.

S506: The first management data function unit receives the management data query request sent by the second management function unit.

S507: The first management data function unit sends, to the second management function unit, the management data corresponding to the first management function unit.

Similarly, the first management function unit may alternatively access management data corresponding to another management function unit (for example, a third management function unit). Specifically, the first management function unit sends a management data query request to the third management function unit, where the management data query request is used to indicate to query management data corresponding to the third management function unit. Then, the first management function unit receives instance information that is of a second management data function unit corresponding to the third management function unit and that is sent by the third management function unit, where the second management data function unit is configured to store the management data corresponding to the third management function unit. In this way, the first management function unit sends a management data query request to the second management data function unit; and the first management function unit receives the management data that corresponds to the third management function unit and that is sent by the second management data function unit.

In this embodiment of the present invention, when the second management function unit needs to obtain the management data corresponding to the first management function unit, the first management function unit may provide, for the second management function unit, instance information of the management data function unit that stores the management data corresponding to the first management function unit, so that the first management function unit can directly obtain, from the first management data function unit, the management data requested by the second management function unit, thereby improving management data query efficiency and ensuring real-time management data transmission.

Further, in this embodiment of the present invention, the management data generated by the management function unit is stored in the management data function unit in a unified manner, and management data access may be implemented between different management function units. Therefore, management data corresponding to the another management function unit does not need to be stored in a database corresponding to a management function unit, thereby reducing redundancy of management data in a network management system and implementing unified management of the management data.

The foregoing mainly describes the solutions provided in the embodiments of the present invention from a perspective of interaction between network elements. It may be understood that, to implement the foregoing functions, the network elements, for example, the management service function unit, the first management function unit, and the first management data function unit, include a corresponding hardware structure and/or a corresponding software module for performing the functions. A person skilled in the art should be easily aware that units, algorithms, and steps in the examples described with reference to the embodiments disclosed in this specification can be implemented by hardware or a combination of hardware and computer software in the embodiments of the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present invention, function module division may be performed on the management service function unit, the first management function unit, the first management data function unit, and the like based on the foregoing method examples, for example, function modules may be obtained through division in correspondence to functions, or two or more functions may be integrated into one processing module. The integrated module may be implemented in a form of hardware, or may be implemented in a form of a software function module. It should be noted that, in the embodiments of the present invention, module division is an example, and is merely logical function division. During actual implementation, another division manner may be used.

Figure 11:
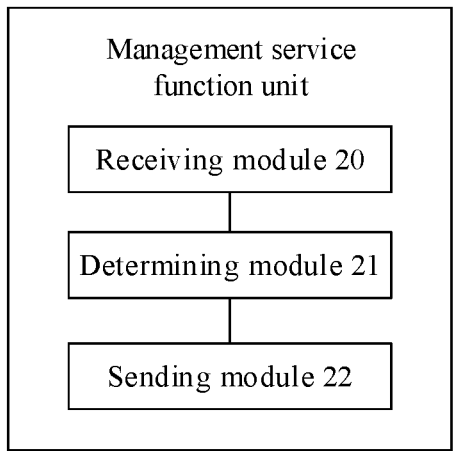
FIG. 11 is a first schematic structural diagram of a management service function unit according to an embodiment of the present invention.

When the function modules are obtained through division in correspondence to the functions, FIG. 11 is a possible schematic structural diagram of the management service function unit in the foregoing embodiments. As shown in FIG. 11, the management service function unit may include a receiving module 20 and a determining module 21. The receiving module 20 may be configured to support the management service function unit in performing S101, S102, S203, S303, and S402 in the foregoing method embodiments. The determining module 21 may be configured to support the management service function unit in performing S103 and S403 in the foregoing method embodiments. Optionally, as shown in FIG. 11, the management service function unit may further include a sending module 22. The sending module 22 may be configured to support the management service function unit in performing S104 and S404 in the foregoing embodiments.

All related content of the steps in the foregoing method embodiments may be cited in function descriptions of corresponding function modules. Details are not described herein again.

Figure 12:
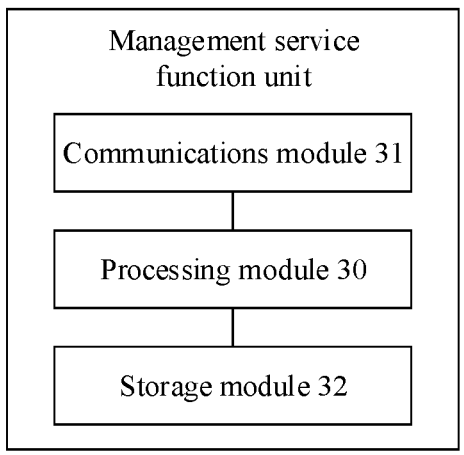
FIG. 12 is a second schematic structural diagram of a management service function unit according to an embodiment of the present invention.

When an integrated unit is used, FIG. 12 is a possible schematic structural diagram of the management service function unit in the foregoing embodiments. As shown in FIG. 12, the management service function unit may include a processing module 30 and a communications module 31. The processing module 30 may be configured to control and manage an action of the management service function unit. For example, the processing module 30 may be configured to support the management service function unit in performing related steps performed by the determining module 21, and/or may be configured to perform another process of the technology described in this specification. The communications module 31 may be configured to support the management service function unit in communicating with another network entity. For example, the communications module 31 may be configured to support the management service function unit in performing related steps performed by the receiving module 20 and the sending module 22 in the foregoing method. Optionally, as shown in FIG. 12, the management service function unit may further include a storage module 32, configured to store program code and data of the management service function unit.

The processing module 30 may be a processor or a controller. The communications module 41 may be a transceiver, a transceiver circuit, a communications interface, or the like. The storage module 42 may be a memory. When the processing module 30 is the processor, the communications module 31 is the transceiver, and the storage module 32 is the memory, the processor, the transceiver, and the memory may be connected through a bus. The bus may be a peripheral component interconnect (peripheral component interconnect, PCI) bus, an extended industry standard architecture (extended Industry standard architecture, EISA) bus, or the like. The bus may be classified into an address bus, a data bus, a control bus, and the like.

Figure 13:
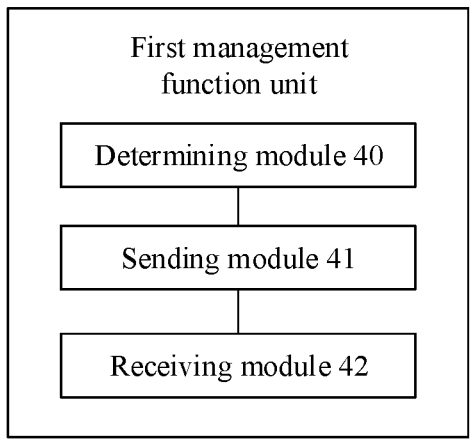
FIG. 13 is a first schematic structural diagram of a first management function unit according to an embodiment of the present invention.

When the function modules are obtained through division in correspondence to the functions, FIG. 13 is a possible schematic structural diagram of the first management function unit in the foregoing embodiments. As shown in FIG. 13, the first management function unit may include a determining module 40 and a sending module 41. The determining module 40 may be configured to support the first management function unit in performing S201 in the foregoing method embodiment. The sending module 41 may be configured to support the first management function unit in performing S202, S401, S406, and S503 in the foregoing method embodiments. Optionally, as shown in FIG. 13, the first management function unit may further include a receiving module 42. The receiving module 42 may be configured to support the first management function unit in performing S405 and S502 in the foregoing method embodiments. All related content of the steps in the foregoing method embodiments may be cited in function descriptions of corresponding function modules. Details are not described herein again.

Figure 14:
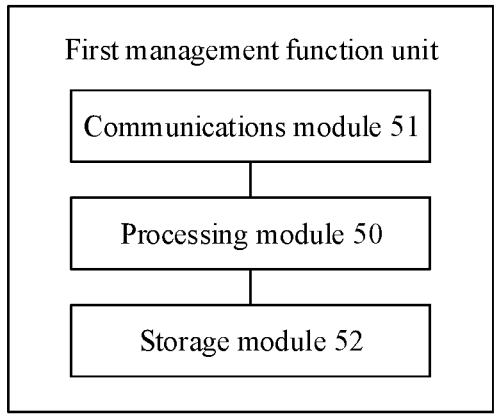
FIG. 14 is a second schematic structural diagram of a first management function unit according to an embodiment of the present invention.

When an integrated unit is used, FIG. 14 is a possible schematic structural diagram of the first management function unit in the foregoing embodiments. As shown in FIG. 14, the first management function unit may include a processing module 50 and a communications module 51. The processing module 50 may be configured to control and manage an action of the first management function unit, and/or may be configured to perform another process of the technology described in this specification. The communications module 51 may be configured to support the first management function unit in communicating with another network entity. For example, the communications module 51 may be configured to support the first management function unit in performing related steps performed by the sending module 41 and the receiving module 42. Optionally, as shown in FIG. 14, the first management function unit may further include a storage module 52, configured to store program code and data of the first management function unit.

The processing module 50 may be a processor or a controller. The communications module 51 may be a transceiver, a transceiver circuit, a communications interface, or the like. The storage module 52 may be a memory. When the processing module 50 is the processor, the communications module 51 is the transceiver, and the storage module 52 is the memory, the processor, the transceiver, and the memory may be connected through a bus. The bus may be a PCI bus, an EISA bus, or the like. The bus may be classified into an address bus, a data bus, a control bus, and the like.

Figure 15:
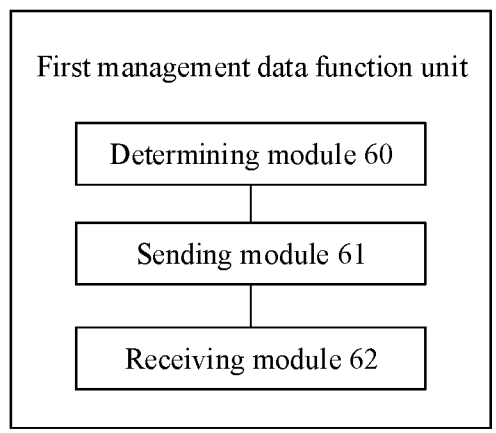
FIG. 15 is a first schematic structural diagram of a first management data function unit according to an embodiment of the present invention.

When the function modules are obtained through division in correspondence to the functions, FIG. 15 is a possible schematic structural diagram of the first management data function unit in the foregoing embodiments. As shown in FIG. 15, the first management data function unit may include a determining module 60 and a sending module 61. The determining module 60 may be configured to support the first management data function unit in performing S301 in the foregoing method embodiment. The sending module 61 may be configured to support the first management data function unit in performing S302 and S507 in the foregoing method embodiments. Optionally, as shown in FIG. 15, the first management data function unit may further include a receiving module 62. The receiving module 62 may be configured to support the first management data function unit in performing S407 and S506 in the foregoing method embodiments. All related content of the steps in the foregoing method embodiments may be cited in function descriptions of corresponding function modules. Details are not described herein again.

Figure 16:
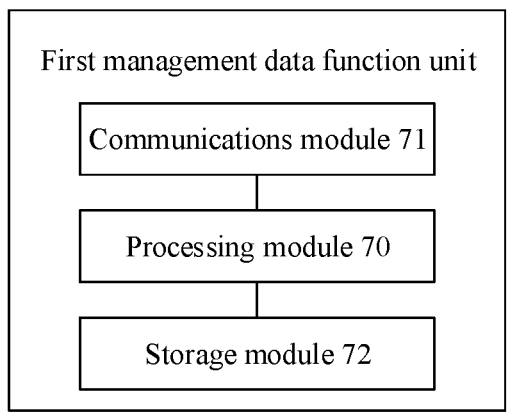
FIG. 16 is a second schematic structural diagram of a first management data function unit according to an embodiment of the present invention.

When an integrated unit is used, FIG. 16 is a possible schematic structural diagram of the first management data function unit in the foregoing embodiments. As shown in FIG. 16, the first management data function unit may include a processing module 70 and a communications module 71. The processing module 70 may be configured to control and manage an action of the first management data function unit. The communications module 71 may be configured to support the first management data function unit in communicating with another network entity. For example, the communications module 71 may be configured to support the first management data function unit in performing related steps performed by the sending module 61 and the receiving module 62 in the foregoing method embodiment and another step in the foregoing method embodiments. Optionally, as shown in FIG. 16, the first management data function unit may further include a storage module 72, configured to store program code and data of the first management data function unit.

The processing module 70 may be a processor or a controller. The communications module 71 may be a transceiver, a transceiver circuit, a communications interface, or the like. The storage module 72 may be a memory. When the processing module 70 is the processor, the communications module 71 is the transceiver, and the storage module 72 is the memory, the processor, the transceiver, and the memory may be connected through a bus. The bus may be a PCI bus, an EISA bus, or the like. The bus may be classified into an address bus, a data bus, a control bus, and the like.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer instructions are loaded and executed on a computer, all or some of the procedures or functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a magnetic disk, or a magnetic tape), an optical medium (for example, a digital video disc (digital video disc, DVD)), a semiconductor medium (for example, a solid-state drive (solid state drives, SSD)), or the like.

The foregoing descriptions about the implementations allow a person skilled in the art to clearly understand that, for the purpose of convenient and brief description, division of the foregoing function modules is used as an example for illustration. In actual application, the foregoing functions can be allocated to different function modules for implementation based on a requirement, that is, an inner structure of an apparatus is divided into different function modules to implement all or some of the foregoing functions. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the foregoing apparatus embodiments are merely an example. For example, the module or unit division is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the method according to the embodiments of this application. The foregoing storage medium includes: any medium that can store program code, such as a flash memory, a removable hard disk, a read-only memory, a random access memory, a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communications apparatus configured to implement a management service function unit, the communications apparatus comprising:
a processor; and
a memory configured to store computer readable instructions that, when executed by the processor, cause the communications apparatus to:
receive an association relationship configuration request, wherein
the association relationship configuration request carries association information,
the association information is used to configure an association relationship between a first management function unit and a first management data function unit,
the first management data function unit is configured to store management data corresponding to the first management function unit,
the first management function unit includes any of a network slice management function (NSMF), a network slice subnet management function (NSSMF), and a network function management function,
the first management data function unit includes a management data center, and
the management service function unit includes a management service management function;
configure and store the association relationship between the first management function unit and the first management data function unit, wherein the association relationship is stored in the management service function unit;
receive a first query request sent by the first management function unit, wherein
the first query request carries instance information of the first management function unit or instance indication information of the first management function unit, and
the first query request indicates to query the first management data function unit corresponding to the first management function unit;
determine instance information of the first management data function unit based on the association relationship, between the first management function unit and the first management data function unit, stored in the management service function unit, wherein the instance information of the first management data function unit corresponds to the instance information of the first management function unit, or
determine instance information of the first management data function unit based on the association relationship, between the first management function unit and the first management data function unit, stored in the management service function unit, wherein the instance information of the first management data function unit corresponds to the instance indication information of the first management function unit; and send the instance information of the first management data function unit to the first management function unit.

2. The communications apparatus according to claim 1, wherein
the association relationship configuration request is an association relationship configuration request of the first management function unit, and the association information comprises the instance information of the first management data function unit, or
the association relationship configuration request is an association relationship configuration request of the first management data function unit, and the association information comprises the instance information of the first management function unit or the instance indication information of the first management function unit.

3. The communications apparatus according to claim 1, wherein
the association information comprises the instance information of the first management function unit and the instance information of the first management data function unit; or
the association information comprises the instance indication information of the first management function unit and the instance information of the first management data function unit.

4. The communications apparatus according to claim 1, wherein
the instance information of the first management function unit comprises at least one of: an instance identifier of the first management function unit, an Internet Protocol (IP) address of an instance of the first management function unit, or a fully qualified domain name (FQDN) of the instance of the first management function unit; or
the instance indication information of the first management function unit comprises at least one of: provider information of the first management function unit, location information of the first management function unit, or type information of a management object of the first management function unit; and
the instance information of the first management data function unit comprises at least one of: an instance identifier of the first management data function unit, an IP address of the first management data function unit, or an FQDN of the first management data function unit.

5. The communications apparatus according to claim 1, wherein
the management data corresponding to the first management function unit includes data of a management object of the first management function unit,
the data of the management object comprises instance data of the management object or performance or fault data of the management object, and
the instance data of the management object comprises at least one of: association data of the management object, a type of the management object, a status of the management object, a location of the management object, a capacity of the management object, an abstract feature of the management object, provider information of the management object, an identity ID of the management object, an Internet Protocol (IP) address of the management object, and a fully qualified domain name (FQDN) of the management object.

6. The communications apparatus according to claim 1, wherein
the management data generated by the first management function unit corresponds to a management object of the first management function unit, and
the management object includes instance data of the management object and/or performance or fault data of the management object.

7. The communications apparatus according to claim 6, wherein
the instance data of the management object belongs to standardized management data, and
the performance or fault data of the management object belongs to non-standardized management data.

8. A communication apparatus configured to implement a first management function unit, the communication apparatus comprising:
a processor; and
a memory configured to store computer readable instructions that, when executed by the processor, cause the communications apparatus to:
determine association information, wherein
the association information comprises instance information of a first management data function unit,
the association information is used to configure an association relationship between the first management function unit and the first management data function unit,
the first management data function unit is configured to store management data corresponding to the first management function unit,
the first management function unit includes any of a network slice management function (NSMF), a network slice subnet management function (NSSMF), and a network function management function, and
the first management data function unit includes a management data center; and
send an association relationship configuration request to a management service function unit, wherein
the association relationship configuration request carries the association information, and
the management service function unit configures and stores, in the management service function unit, the association relationship between the first management function unit and the first management data function unit;
send a first query request to the management service function unit, wherein
the first query request carries the instance information of the first management function unit or instance indication information of the first management function unit,
the first query request indicates to query the first management data function unit corresponding to the first management function unit, and
the management service function unit determines instance information of the first management data function unit based on the association relationship, between the first management function unit and the first management data function unit, stored in the management service function unit; and
receive the instance information of the first management data function unit sent by the management service function unit.

9. The communication apparatus according to claim 8, wherein the communications apparatus to is further caused to:
send, to the first management data function unit, the management data corresponding to the first management function unit.

10. The communication apparatus according to claim 9, wherein the communications apparatus to is further caused to:
receive a management data query request sent by a second management function unit, wherein the management data query request indicates to query the management data corresponding to the first management function unit; and
send, to the second management function unit, the instance information of the first management data function unit, wherein the instance information corresponds to the first management function unit.

11. The communication apparatus according to claim 9, wherein the communications apparatus to is further caused to:
send a management data query request to a third management function unit, wherein the management data query request indicates to query management data corresponding to the third management function unit;
receive instance information that is of a second management data function unit corresponding to the third management function unit and that is sent by the third management function unit, wherein the second management data function unit is configured to store the management data corresponding to the third management function unit;
send a management data query request to the second management data function unit; and
receive the management data that corresponds to the third management function unit and that is sent by the second management data function unit.

12. A system, comprising:
a first server including:
a processor, and
a memory; and
a second server including:
a processor, and
a memory, wherein
the first server is configured to implement a first management function unit,
the second server is configured to implement a management service function unit,
the first management function unit is configured to:
determine association information, wherein
the association information comprises instance information of a first management data function unit,
the association information is used to configure an association relationship between the first management function unit and the first management data function unit,
the first management data function unit is configured to store management data corresponding to the first management function unit;
the first management function unit includes any of a network slice management function (NSMF), a network slice subnet management function (NSSMF), and a network function management function,
the first management data function unit includes a management data center, and
the management service function unit includes a management service management function; and
send an association relationship configuration request to the management service function unit, wherein the association relationship configuration request carries the association information; and
the management service function unit is configured to:
receive the association relationship configuration request;
configure and store the association relationship between the first management function unit and the first management data function unit, wherein the association relationship is stored in the management service function unit;
receive a first query request sent by the first management function unit, wherein
the first query request carries instance information of the first management function unit or instance indication information of the first management function unit, and
the first query request indicates to query the first management data function unit corresponding to the first management function unit; and
determine, based on the first query request and the association relationship between the first management function unit and the first management data function unit stored in the management service function unit, the instance information of the first management data function unit, wherein the instance information of the first management data function unit corresponds to the instance information of the first management function unit; or
determine, based on the first query request and the association relationship between the first management function unit and the first management data function unit stored in the management service function unit, the instance information of the first management data function unit, wherein the instance information of the first management data function unit corresponds to the instance indication information of the first management function unit; and
send the instance information of the first management data function unit to the first management function unit.

13. The system according to claim 12, wherein
the association relationship configuration request is an association relationship configuration request of the first management data function unit, the association information comprises the instance information of the first management function unit or the instance indication information of the first management function unit; or
the association relationship configuration request is an association relationship configuration request of the first management data function unit, the association information comprises the instance information of the first management function unit or the instance indication information of the first management function unit.

14. The system according to claim 12, wherein the association information comprises the instance information of the first management function unit and the instance information of the first management data function unit; or
the association information comprises the instance indication information of the first management function unit and the instance information of the first management data function unit.

15. The system according to claim 12, wherein
the first management function unit is further configured to:
- send the first query request to the management service function unit;
- receive the instance information of the first management data function unit from the management service function unit; and
- send, to the first management data function unit, the management data corresponding to the first management function unit.

16. The system according to claim 15, wherein the first management function unit is further configured to:
- receive a management data query request sent by a second management function unit, wherein the management data query request indicates to query the management data corresponding to the first management function unit; and
- send, to the second management function unit, the instance information of the first management data function unit, wherein the instance information corresponds to the first management function unit.

17. The system according to claim 15, wherein the first management function unit is further configured to:
- send a management data query request to a third management function unit, wherein the management data query request indicates to query management data corresponding to the third management function unit;
- receive instance information that is of a second management data function unit corresponding to the third management function unit and that is sent by the third management function unit, wherein the second management data function unit is configured to store the management data corresponding to the third management function unit;
- send a management data query request to the second management data function unit; and
- receive the management data that corresponds to the third management function unit and that is sent by the second management data function unit.

18. The system according to claim 12, wherein the instance information of the first management function unit comprises at least one of: an instance identifier of the first management function unit, an Internet Protocol (IP) address of an instance of the first management function unit, or a fully qualified domain name (FQDN) of the instance of the first management function unit; or the instance indication information of the first management function unit comprises at least one of: provider information of the first management function unit, location information of the first management function unit, or type information of a management object of the first management function unit; and the instance information of the first management data function unit comprises at least one of: an instance identifier of the first management data function unit, an IP address of the first management data function unit, or an FQDN of the first management data function unit.

19. The system according to claim 12, wherein
the management data corresponding to the first management function unit is data of a management object of the first management function unit, the data of the management object comprises instance data of the management object or performance or fault data of the management object, and the instance data of the management object comprises at least one of the following: association data of the management object, a type of the management object, a status of the management object, a location of the management object, a capacity of the management object, an abstract feature of the management object, provider information of the management object, an identity ID of the management object, an Internet Protocol (IP) address of the management object, and a fully qualified domain name (FQDN) of the management object.

* * * * *